(No Model.)

G. F. & F. BREITSTEIN.
SWIVEL LEADER HOLDER.

No. 575,205. Patented Jan. 12, 1897.

WITNESSES:
Donn Twitchell

INVENTORS
G. F. Breitstein.
F. Breitstein.
BY
ATTORNEYS.

UNITED STATES PATENT OFFICE.

GEORGE F. BREITSTEIN AND FRANCIS BREITSTEIN, OF NEW YORK, N. Y.

SWIVEL LEADER-HOLDER.

SPECIFICATION forming part of Letters Patent No. 575,205, dated January 12, 1897.

Application filed October 14, 1896. Serial No. 608,819. (No model.)

*To all whom it may concern:*

Be it known that we, GEORGE F. BREITSTEIN and FRANCIS BREITSTEIN, of New York city, in the county and State of New York, have invented a new and Improved Swivel Leader-Holder, of which the following is a full, clear, and exact description.

Our invention relates to an improvement in swivel leader-holders for fishing-lines.

The object of the invention is to render the said holder simple, durable, economic, and capable of ready and convenient attachment to a line.

A further object of the invention is to so construct the holder that one or more leaders may be quickly attached without knotting or otherwise permanently tying the leaders to the holder.

Another object of the invention is to provide guides or wings to be engaged by the leaders, swiveled upon a center stem and bearing such relation to one another that tension upon one will hold the other pointing in an opposite direction, so that when more than one leader is attached to the holder the liability of the leaders becoming entangled will be reduced to a minimum.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
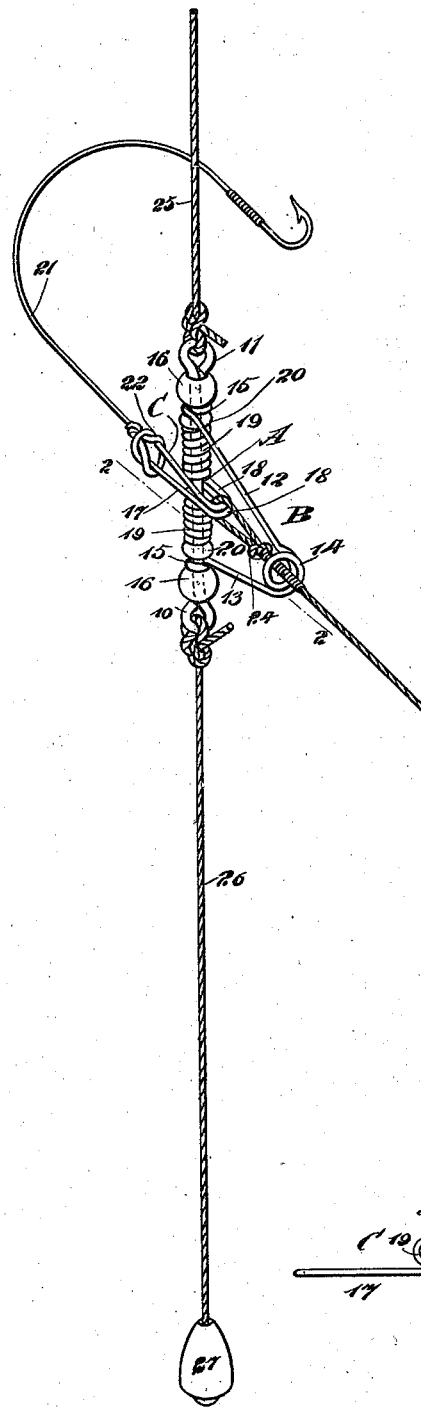
Figure 2:
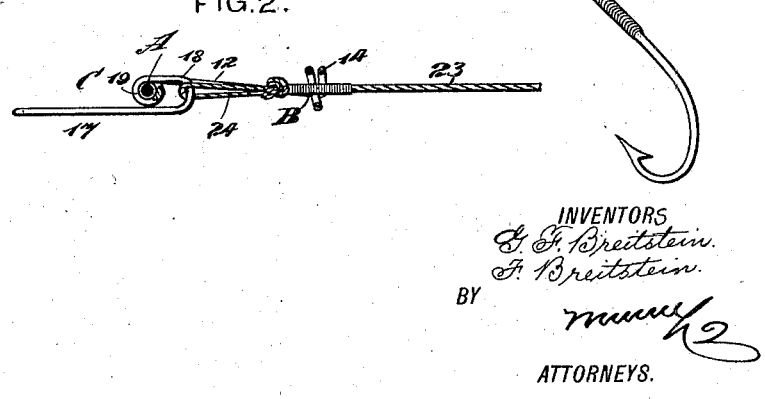

Figure 1 is a perspective view of the said device, and Fig. 2 is a section taken substantially on the line 2 2 of Fig. 1.

In carrying out the invention the holder consists of a central stem A, provided at one end with an eye 10 and at the opposite end with an eye 11, and two wings B and C, arranged to extend normally beyond opposite sides of the central stem. Both of the wings B and C are preferably made from wire of suitable gage and of desired material, brass being ordinarily employed. In the construction of the wing B the wire is bent to a substantially triangular shape, comprising two sides 12 and 13, the wire at the contracted end of the wing B being coiled or otherwise bent upon itself to produce an eye 14, through which the leader may freely pass, and each side member 12 and 13 of the wing B terminates in an eye 15, through which eyes the central stem A is passed, and washers 16 are loosely mounted on the stem between its eyes and the eyes of the wing B through which the stem is passed.

In the construction of the opposite wing C the wire is bent to form a twin shank 17, widest at its outer end, and a hook 18 at the inner end of the shank. The hook portion of the wing C is located at the central portion of the stem, or about centrally between the side members of the opposing wing B, and extends into this wing a predetermined distance, being practically in horizontal alinement with the guide-eye 14 of the triangular wing B. The wire from which the wing C is made is carried, after the hook 18 is produced, around the stem above and below the hook in the form of coils 19, and washers 20 are loosely mounted on the stem between the ends of the coils 20 and the inner or pivoting eyes of the triangular wing B.

The short leader 21 is provided with a loop 22 at its inner end, and by slipping this loop over the twin shank of the wing C and then passing the end of the leader carrying the hook outward between the members of the shank the short leader 21 will be firmly yet removably secured to the outer end of the wing C. The longer leader 23 is provided likewise with a loop 24 at its inner end, and this loop is passed through the guide-eye 14 of the larger wing B and is then passed over the shank of the central and opposing wing C until it has engagement with the hook portion 18 of this wing, whereby in the event that tension is applied at the hook of the longer leader the said leader will draw straight from the central portion of the swivel-holder and will force the opposing wing C to stand at a directly-opposite position, preventing the shorter leader, if one is used, from possibly becoming entangled with the longer leader; yet both leaders may be carried around the central stem as many times as desired without becoming entangled with the central stem, owing to the peculiar attachment shown between the leaders and the wings and the wings and the stem. The fishing-line 25 is attached to the swivel-holder at its upper eye 11, and if a sinker 27 is used the line attached to the sinker is attached to the lower eye 10 of the swivel.

Having thus described our invention, we claim as new and desire to secure by Letters Patent—

1. A swivel leader-holder, comprising a stem, and wings swiveled upon the stem and normally projecting in opposite directions, as and for the purpose specified.

2. In a swivel leader-holder, a stem, and wings mounted to turn independently of the said stem, one wing being located between the inner ends of the other wing, one of the said wings being in the form of a hook and the other wing being provided with a guide-eye to receive a leader when attached to the hook portion of the hook-shaped wing, as and for the purpose specified.

3. A swivel leader-holder, consisting of a stem, a hook-shaped wing held to turn around the central portion of the said stem, and a second wing mounted to turn on the stem near its end portions, the latter wing being provided at its outer end with an eye arranged to face the central hook-shaped wing, as and for the purpose specified.

4. A swivel leader-holder, comprising a stem, a substantially triangular wing having its inner ends loosely mounted on the stem and its outer end provided with an eye, and a second wing held to turn around the central portion of the stem, comprising an outwardly-extending shank and a hook-shaped inner extremity, which extends partially around the said stem, as and for the purpose specified.

5. A swivel leader-holder, consisting of a stem, a wing constructed of wire and of substantially triangular shape, having the extremities of its members at its wider end pivoted on the said stem, the said wing being also provided at its contracted end with an eye, and a second wing likewise constructed of wire and held to turn around the central portion of the stem between the extremities of the first-named wing, the second wing comprising a twin shank extending outwardly from the stem and an inner hook-section connected with the stem and arranged to extend within the triangular wing, as and for the purpose specified.

6. A swivel leader-holder, comprising a stem and wings independently pivoted on the stem, one of the wings being located at the center of the stem and the other connected with the stem near its ends, the latter wing being provided with an eye and the central wing with a hook-section, substantially in alinement with the eye of the expanded wing, as set forth.

7. In a swivel leader-holder, the combination with a stem, of a hook swiveled upon the stem and having its end extended to project from the side of the stem opposite from that which the hook proper projects, and formed with an opening therein, as and for the purpose set forth.

8. In a swivel leader-holder, the combination with a stem, of a hook swiveled upon the stem and having its end extended to project from the side of the stem opposite from that which the hook proper projects and formed with an opening therein, and a leader-guide swiveled upon the stem, as set forth.

GEORGE F. BREITSTEIN.
FRANCIS BREITSTEIN.

Witnesses:
　HENRY FETT,
　LOUIS FRIEDRICH, Sr.